United States Patent [19]
Lee

[11] 4,431,541
[45] Feb. 14, 1984

[54] CIRCULAR FILTER DEVICE

[76] Inventor: Arleigh Lee, 201 Fish House Rd., Broadalbin, N.Y. 12025

[21] Appl. No.: 411,432

[22] Filed: Aug. 25, 1982

[51] Int. Cl.³ .............................................. B01D 35/22
[52] U.S. Cl. .................................... 210/393; 210/411; 210/412; 210/415; 210/427
[58] Field of Search ............... 210/391, 393, 408, 409, 210/411, 412, 415, 424, 427

[56] References Cited
U.S. PATENT DOCUMENTS
3,112,263 11/1963 Ellila ..................................... 210/415

Primary Examiner—Frank Sever
Attorney, Agent, or Firm—John S. Roberts, Jr.

[57] ABSTRACT

A circular filter having separated inlet and outlet compartments such that cheese whey or the like is pumped into the vessel, is forced across a filter screen, and the filtered whey is discharged downstream for further processing. This invention incorporates (1) two rotating showers to clean the filter and (2) an outlet valve which recycles filtered whey for additional filtering and cleaning.

16 Claims, 1 Drawing Figure

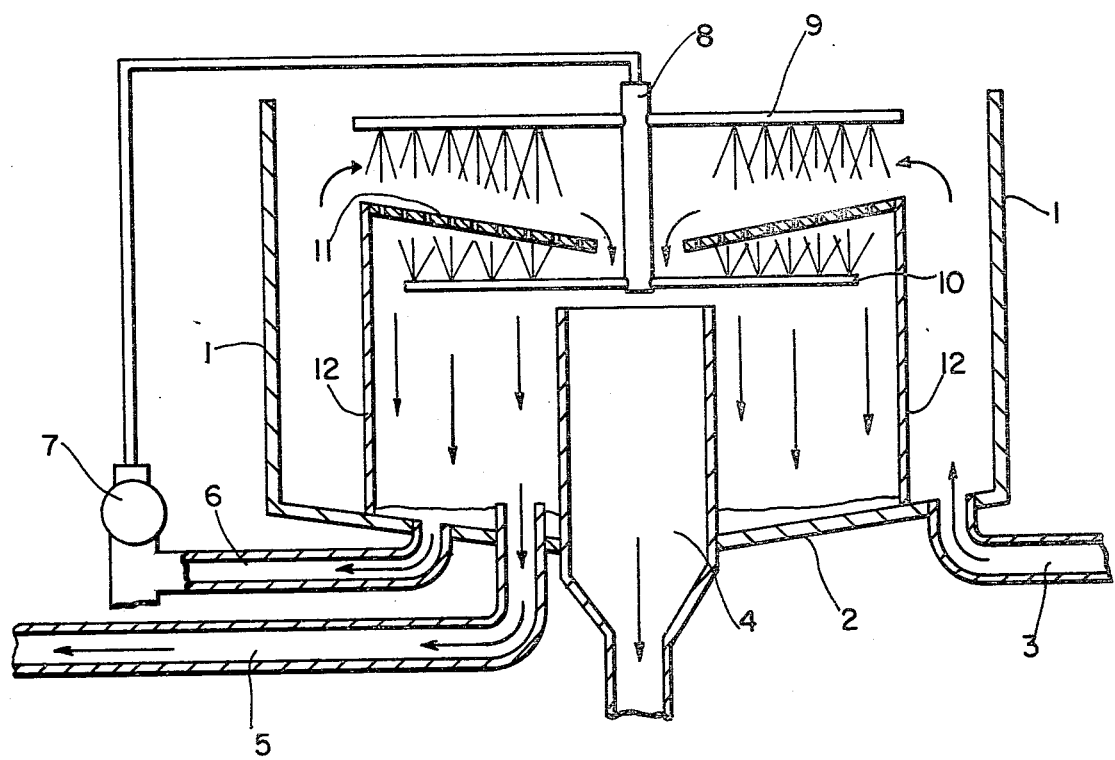

CIRCULAR FILTER DEVICE

UTILITY

This invention is used to filter whey without the need of a storage/surge tank, thus eliminating a prime source of contamination. The invention is an improvement over prior art in that a two-shower system provides constant cleaning of the filter media and allows the use of fine mesh filters. This increases productivity and decreases the amount of fines lost during the filtration process.

BRIEF DESCRIPTION OF THE DRAWING

The drawing shows the best mode of the invention.

DESCRIPTION OF THE DRAWING

The housing is made of an outer upstanding wall (1) connected to a bottom wall (2). Inside the housing are two inner upstanding walls (12) one of which supports a sloping screen (11). A fluid inlet (3) opens between the outer wall (1) and the inner walls (12). Three discharge outlets exit through the bottom wall: a centrally disposed passageway (4) removes the bulk of the large particles; one outlet (5) removes effluent (filtered whey) from the system; the other outlet (6) recycles effluent through a pump (7) to a rotatable shower means (8). The shower means comprises two sets of rotating shower arms: one shower arm (9) is located above a filter screen (11) and directs spray down onto the filter; the other shower arm (10) is located below the filter screen (11) and backwashes the underside of the filter screen.

DESCRIPTION AND BACKGROUND

Approximately ten pounds of cheese is made from each one hundred pounds of milk. During the draining of the resulting ninety pounds of whey, small bits of cheese curd (fines) escape. Since there is a trend to use larger vats, to use pumps excessively, and to use harsh stirring methods, the small and acceptable loss of fines in earlier machines has become a much greater loss. Furthermore, the disposal of whey with a heavy solids content presents large ecological problems. Subsequent whey refinement processes—evaporation, reverse osmosis treatments, and cream separation—are very difficult due to the presence of these fines particles. In addition, the use of larger vats exacerbates the problems of maintaining pH, texture, and temperature, and preventing contamination. The present invention teaches a closed system (which prevents bacteriaphage and other contamination) utilizing a filter screen which may be cleaned in place by means of an upper and lower shower. Unfiltered whey direct from the vat is introduced into the outer compartment of the circular vessel so that overflow occurs perfectly around the perimeter of the filter screen which covers the inside compartment. An opening in the center of the screen, which is slightly sloped, accepts the fines that are recovered from the whey. These may be instantly returned to the original vat by means of a small pump. A portion of the filtered whey is taken from the inner compartment and pumped through a drive shaft mounted in the center of the cover. Inside the cover a top shower consisting of three elbow-shaped arms with built-in slotted nozzles sweeps the curd to the central passageway located in the middle of the filter screen. Since warm cheese tends to become fixed into the screen material, a second shower resembling the first but located below the filter screen sprays upwardly against the bottom of the filter. This bottom shower is connected to the top shower, deriving its rotation and its liquid from the top shower. This is the preferred mode; as an alternative, these showers may be driven by independent rotation and liquid means. Cheese fines are thereby prevented from collecting in or on the screen material.

The state of the art to date fails to incorporate this second shower and, therefore, is ineffective for the filtering of whey. Ellila (U.S. Pat. No. 3,112,263) teaches a screen sloping to a center outlet and equipped with a single shower. This device, however, has no second shower, nor does it contain outlet means to recycle filtered material. In practice this means that Ellila's invention is ineffective for the filtering of high bulk slurries of which cheese whey is only an example. Another patent, Stinson (U.S. Pat. No. 2,582,401) teaches a three-tiered device for filtering and cleaning industrial effluent water. Again, this invention incorporates only one shower and only filters fluids with a very low bulk content and small particle size.

I claim:

1. A fluid filtering device comprising elements designed, dimensioned and arranged for treating high bulk slurries such as cheese whey including a housing having a bottom wall, an upstanding wall disposed therearound, and a centrally disposed passageway; a sloping screen disposed between said passageway and said upstanding wall; a fluid inlet means disposed adjacent to said screen and causing said fluid to move thereover; at least two discharge outlets disposed in said bottom wall; shower means including a rotatable shower manifold disposed above said screen and directing fluid thereagainst; and a second rotatable shower manifold positioned beneath said screen and directing fluid upwardly thereagainst; and means for rotating said shower manifold whereby solid laden fluid is introduced into said inlet and caused to pass over said screen causing the heavier solids to move toward the central passageway for discharge, with the lighter solids being carried by the fluid through said discharge outlets.

2. The fluid filtering device of claim 1 including a second upstanding wall disposed near the first upstanding wall, with said fluid inlet means therebetween, directing fluid circumferentially therearound.

3. The fluid filtering device of claim 2 wherein discharge from one of said outlets is returned to said rotating shower means.

4. The fluid filtering device of claim 3 wherein the bottom wall slopes downwardly toward said central passageway and is substantially parallel to said screen.

5. The fluid filtering device of claim 4 wherein the central passageway is a conduit pipe disposed centrally of said bottom.

6. The fluid filtering device of claim 1 wherein the shower manifolds are nested one below the other on a common shaft.

7. The fluid filtering device of claim 4 wherein the shower manifolds are disposed within the confines of the second upstanding wall.

8. The fluid filtering device of claim 1 wherein the housing is circular in cross-section and the solid-laden fluid is caused to be discharged about the perimeter and downwardly over the screen.

9. The fluid filtering device of claim 8 which includes a lid.

10. The fluid filtering device of claim 1 which includes a lid.

11. The fluid filtering device of claim 1 in which the shower manifolds are attached to a central tube by means of conventional quick release connections.

12. The filtering fluid device of claim 1 which includes legs supporting said housing.

13. The fluid filtering device of claim 1 which includes said top shower manifold connected to bottom shower manifold by means of a central tube.

14. The fluid filtering device of claim 1 including a bottom shower manifold having a conventional quick release connection attaching said manifold to a centrally located tube.

15. The fluid filtering device of claim 1 including a removable filter.

16. The fluid filtering device of claim 1 wherein the shower manifolds are driven by independent rotation and liquid means.

* * * * *